US005197675A

United States Patent [19]

Daly

[11] Patent Number: 5,197,675

[45] Date of Patent: Mar. 30, 1993

[54] FUEL RAIL HAVING ROLLING BALL FUEL INJECTORS

[75] Inventor: Paul D. Daly, Troy, Mich.

[73] Assignee: Siemens Automotive L.P., Auburn Hills, Mich.

[21] Appl. No.: 830,101

[22] Filed: Feb. 4, 1992

Related U.S. Application Data

[63] Continuation-in-part of Ser. No. 653,598, Feb. 11, 1991, abandoned.

[51] Int. Cl.[5] .................... F02M 51/06; F16K 31/10

[52] U.S. Cl. .................... 239/585.2; 239/586; 239/900; 251/129.14; 123/472

[58] Field of Search .............. 239/585.1, 585.2, 585.3, 239/586, 900; 251/129.14, 129.16, 129.22, 901; 123/472

[56] References Cited

U.S. PATENT DOCUMENTS

| | | | |
|---|---|---|---|
| 1,879,165 | 9/1932 | French | 239/585.2 X |
| 2,056,322 | 10/1936 | Hoppe . | |
| 2,096,808 | 10/1937 | Jenkins et al. . | |
| 2,887,125 | 5/1959 | Lucien . | |
| 3,009,655 | 11/1961 | Palmer . | |
| 3,273,805 | 9/1966 | Hall . | |
| 3,472,458 | 10/1969 | Biggle | 239/585.2 |
| 3,506,030 | 4/1970 | Vesco . | |
| 3,556,156 | 1/1971 | Fuller, Jr. . | |
| 3,884,417 | 5/1975 | Sheffield et al. . | |
| 4,013,223 | 3/1977 | Martin . | |
| 4,142,683 | 3/1979 | Casey et al. | 239/900 X |
| 4,252,094 | 2/1981 | Draxler . | |
| 4,365,758 | 12/1982 | Schaming . | |
| 4,390,130 | 6/1983 | Linssen et al. . | |
| 4,395,988 | 8/1983 | Knapp et al. | 239/900 X |
| 4,556,195 | 12/1985 | Calkins . | |
| 4,558,587 | 12/1985 | Fruzzetti . | |
| 4,580,598 | 4/1986 | Itoh . | |
| 4,585,176 | 4/1986 | Kubach et al. | 239/900 X |
| 4,597,558 | 7/1986 | Hafner et al. | 239/900 X |
| 4,684,104 | 8/1987 | Micard . | |
| 4,722,482 | 2/1988 | Jordan et al. . | |
| 4,732,327 | 3/1988 | Aichele et al. . | |
| 4,766,405 | 8/1988 | Daly et al. . | |
| 4,782,860 | 11/1988 | Sakaguchi et al. . | |
| 4,836,246 | 6/1989 | Lemp . | |
| 4,844,036 | 7/1989 | Bassler . | |
| 4,878,650 | 11/1989 | Daly et al. . | |
| 4,892,286 | 1/1990 | Reinicke et al. . | |
| 4,950,171 | 8/1991 | Muzslay . | |

FOREIGN PATENT DOCUMENTS

| | | | |
|---|---|---|---|
| 171284 | 5/1906 | Fed. Rep. of Germany | 239/586 |
| 220043 | 3/1910 | Fed. Rep. of Germany | 251/129.14 |
| 3535438 | 4/1987 | Fed. Rep. of Germany | 239/900 |

*Primary Examiner*—Andres Kashnikow
*Assistant Examiner*—William Grant
*Attorney, Agent, or Firm*—George L. Boller; Russel C. Wells

[57] ABSTRACT

A number of fuel injectors are mounted on an elongated carrier that has been inserted endwise into an open end of an elongated hole in a member such as a tube or an engine manifold. Electrical lead wires extend from the fuel injectors along the carrier to a connector on the exterior. The fuel injectors' nozzles are received in sealed manner in holes extending through the wall of said member. A keeper also inserted endwise through the elongated hole in the member keeps the carrier in place. Each injector has a sphere that is resiliently biased by a flat spring blade to close the outlet orifice leading from the frustoconical seat on which the sphere is seated. The spring blade is cantilever-mounted atop a post adjacent the seat. A magnetic circuit encircles the sphere and comprises an armature that acts against the side of the sphere to displace the sphere to eccentricity with the seat for opening the outlet orifice. The elongated hole is filled with pressurized liquid fuel so that the injectors will be immersed in fuel and will inject fuel from their nozzles when their spheres are displaced to eccentricity with their seats.

37 Claims, 6 Drawing Sheets

FUEL RAIL HAVING ROLLING BALL FUEL INJECTORS

REFERENCE TO A RELATED APPLICATION

This application is a continuation-in-part of commonly assigned allowed application Ser. No. 07/653,598, filed Feb. 11, 1991.

FIELD OF THE INVENTION

This invention relates to fuel rails and fuel injectors for internal combustion engines.

BACKGROUND AND SUMMARY OF THE INVENTION

Conventional fuel rails for fuel-injected internal combustion engines comprise sockets which are spaced apart along the fuel rail's length and into which the fuel injectors are inserted. The fuel injectors are retained in fluid-tight relation to the fuel rail by suitable sealing and retention means. The typical fuel injector has an elongated shape and is customarily arranged on the fuel rail such that the long dimension of the injector is transverse to the long dimension of the fuel rail. As a consequence of this arrangement, the envelope that is occupied by the fuel rail assembly in the engine compartment of an automotive vehicle will have an extent transverse to the fuel rail that is determined by the long dimension of the fuel injector. Accordingly, a reduction in the extent to which a fuel injector projects transversely of the fuel rail will be beneficial in reducing the envelope occupied by the fuel rail assembly, and this benefit will accrue to the advantage of automotive vehicle designers insofar as styling and packaging considerations are concerned.

One of the several aspects of the present invention relates to a fuel rail that contains a novel fuel injector configuration which allows for certain reductions in the size of the envelope that is occupied by the fuel rail assembly on an internal combustion engine, particularly reductions in the extent to which the fuel injectors project transversely of the fuel rail. More specifically, the fuel rail may comprise a circular cylindrical-walled tube within which the fuel injectors are essentially entirely disposed so that the transverse dimension of the fuel rail assembly at the location of a fuel injector is essentially that of the O.D. of the tube. The fuel injectors are mounted on a carrier to form a sub-assembly that is assembled into the tube by endwise insertion. The electrical leads for the fuel injectors run along the carrier to a receptacle that is at one lengthwise end of the completed fuel rail assembly. The injectors' tip ends from which liquid fuel is injected are seated in a sealed manner in holes in the sidewall of the tube.

The fuel injectors themselves are unique. Rather than having a solenoid, an armature, a needle, and a seat coaxially arranged along the length of the fuel injector, as in conventional fuel injectors, the fuel injector of the present invention has a magnetic circuit that encircles a spherical valve element. This sphere is resiliently urged by a cantilever spring blade toward closure of a hole that is circumscribed by a frusto-conical seat. The sphere-encircling magnetic circuit may be considered to comprise four sides. The armature and the solenoid are disposed at two opposite sides. The stator has a U-shape whose base passes through the solenoid and whose legs form the remaining two sides. The armature is a bar of magnetically permeable material whose midpoint acts on the sphere. When the solenoid is not energized, working gaps exist between the ends of the bar and the distal ends of the stator's legs, and when the solenoid is energized, the magnetic flux attracts the bar to reduce these working gaps. As a result, the bar pushes the sphere out of concentricity with the seat to cause the hole to open and pass for injection from the injector's tip end the pressurized liquid fuel that has been supplied to the injector via the interior of the fuel rail tube. When the solenoid is de-energized, the cantilever spring pushes the sphere back to concentricity with the seat, and the resultant hole closure terminates the injection. The fuel injector of the invention is well-suited for miniaturization to fit within a fuel rail and is an efficient and economical use of parts and materials.

Other inventive features relating to the fuel injectors involve control means for attenuating undesirable sphere bounce, and swirl-imparting means for imparting a swirl component to the injected fuel so that a conical-shaped injection spray may be produced.

Further features, advantages, and benefits of the invention, along with those already mentioned, will be seen in the ensuing description and claims, which are accompanied by drawings. The drawings disclose a presently preferred embodiment of the invention according to the best mode contemplated at the present time in carrying out the invention.

DESCRIPTION OF THE PREFERRED EMBODIMENT

Figure 1:
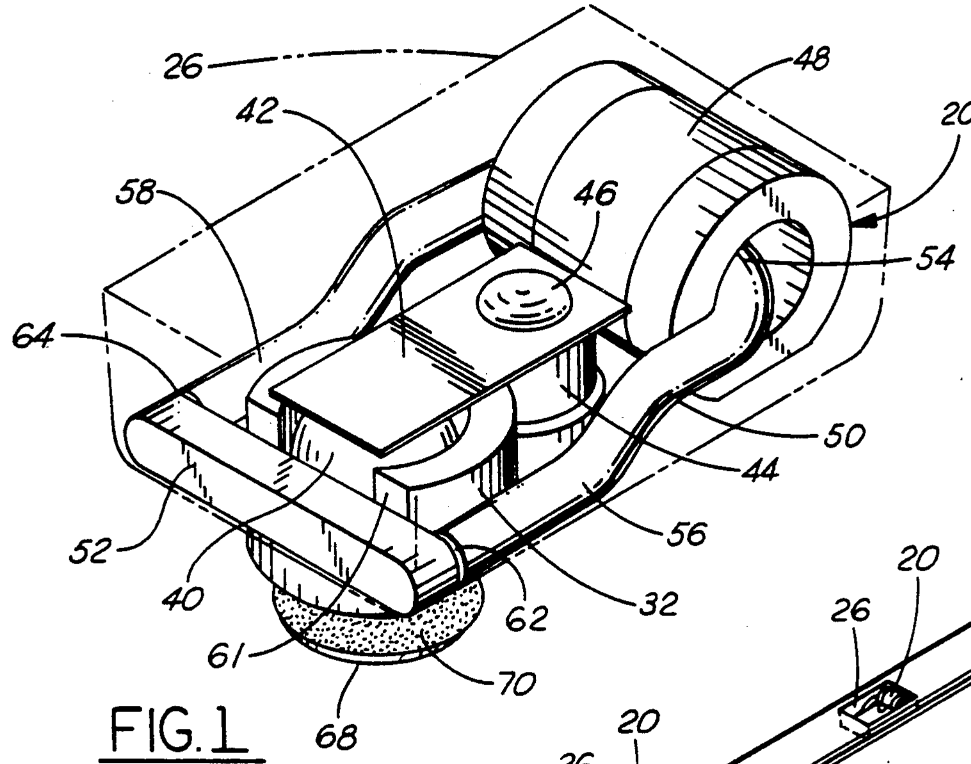
FIG. 1 is a perspective view illustrating the general organization and arrangement of a fuel injector embodying principles of the invention.
Figure 5:
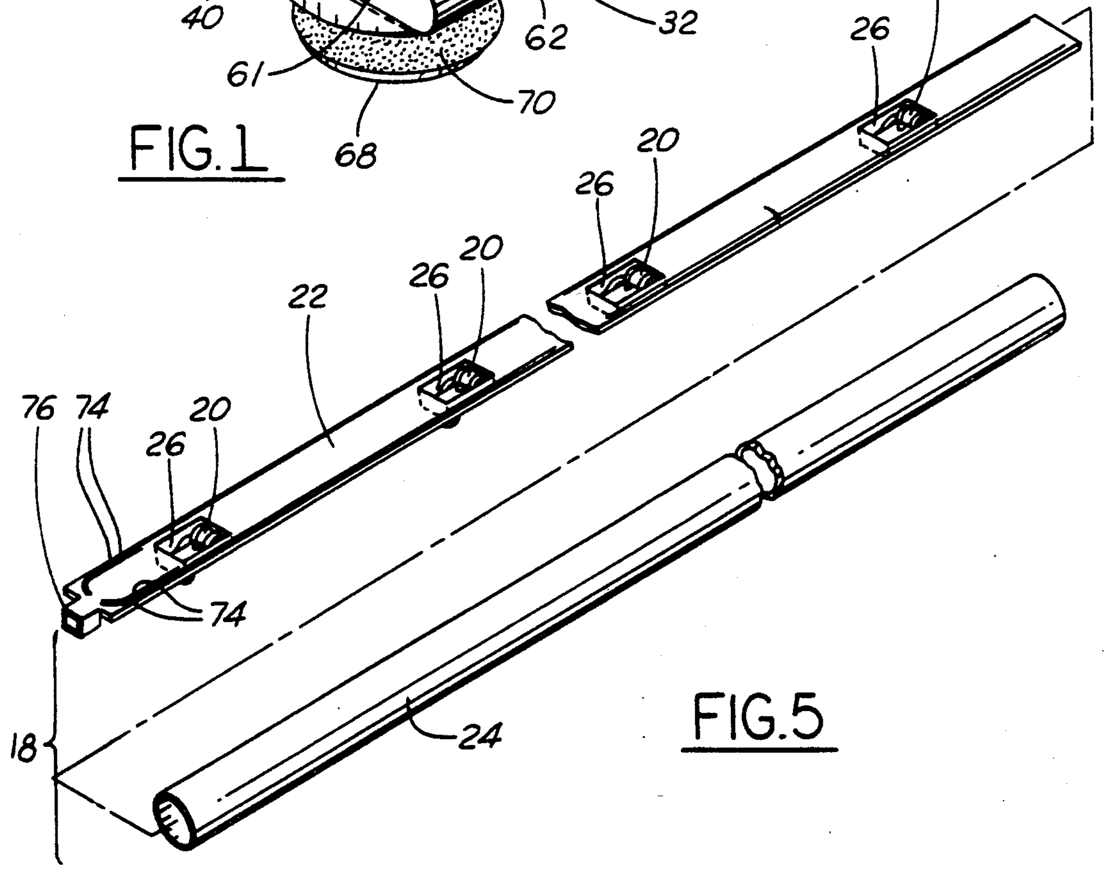
FIG. 5 is an exploded perspective view of certain portions of a fuel rail assembly that embodies principles of the invention and contains fuel injectors like that of FIGS. 1–4.
Figure 2:
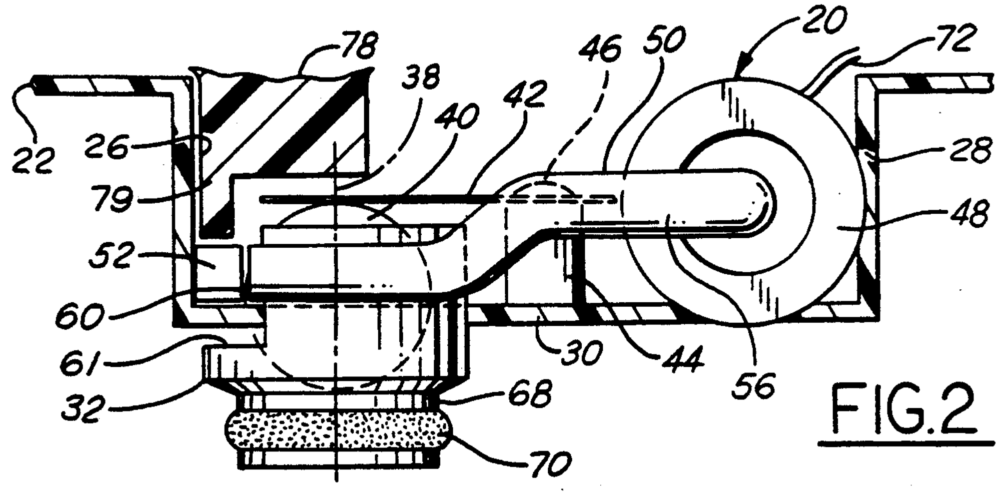
FIG. 2 is a side elevational view of the fuel injector of FIG. 1 from one direction.

FIGS. 1–7 disclose a fuel rail assembly 18 containing several fuel injectors 20 pursuant to the present invention. The fuel injectors are disposed on a carrier 22 that fits within a circular cylindrical walled tube 24, and there are four injectors for this particular example.

For each injector 20, carrier 22 comprises a somewhat rectangular-shaped well 26 which has a sidewall 28 and a bottom wall 30. Each injector comprises a seat member 32 that has a frustoconical seat 34 that funnels to a hole 36. Seat 34 and hole 36 share a co-axis 38 which is perpendicular to bottom wall 30, and wall 30 has a suitably-shaped hole allowing seat member 32 to fit therein in the manner illustrated. A sphere 40 is seated on seat 34, and all FIGS. show the sphere concentric with axis 38 in closure of hole 36. The sphere is resiliently urged to such concentricity by an overlying flat spring blade 42 which is cantilever-mounted atop an upright post 44 on wall 30 aside seat member 32. All Figs. show blade 42 to be essentially parallel with wall 30. The cantilever mounting of the blade on the post is accomplished by means of a hole in the blade through which a close-fitting pin on the post passes and a head 46 on the pin which overlaps the margin of the hole in the blade to hold the corresponding end of the blade securely on the top of post 44. Alternately, post 44 could have a hole in its top, and the shank of a headed screw could be passed through the hole in the blade, and the screw tightened in the post hole so that the screw head holds the blade against the top of the post. Although the Figs. show the blade to be flat and essentially parallel with wall 30, the spring exerts a pre-load force on sphere 40 when the sphere is concentric with axis 38. This pre-load can be created by suitable shaping of the blade, by setting the relative elevations of the top of post 44 and the top of the sphere in a particular way, or by a combination of both.

The injector has a magnetic circuit that encircles sphere 40 and is composed of a solenoid coil 48, a stator 50, and an armature 52. As viewed in FIG. 3, the magnetic circuit may be considered to have a generally four-sided rectangular shape for fitting into well 26. Coil 48 and armature 52 form two opposite sides while the remaining two sides, which are opposite each other, are formed by portions of stator 50. Coil 48 is disposed in well 26 with its axis parallel to bottom wall 30 and spaced from axis 38. Wall 30 includes a hole for cradling coil 48. Stator 50 is generally U-shaped, comprising a base 54 that passes through coil 48 and parallel legs 56, 58 that extend from base 54 to form two opposite sides of the magnetic circuit. Legs 56, 58 contain bends that provide for the transition from the level of coil 48 to the level of sphere 40. Armature 52 is in the form of a bar that is disposed along side sphere 40 and operated by the magnetic circuit to act on the sphere at essentially the midpoint of the bar indicated by the reference numeral 60. Seat member 32 contains a suitably shaped notch 61 that allows the armature to act on the sphere. In the condition portrayed in the Figs., which is for the solenoid coil not energized, the opposite ends of the bar are spaced from the distal ends of legs 56, 58 by generally equal working gaps 62, 64, and the midpoint of the armature is in contact with the sphere at the end of a particular radial of the sphere. When the solenoid coil is energized, the magnetic flux that is generated in the magnetic circuit operates to reduce working gaps 62, 64 by attracting armature 52 toward the ends of the stator's legs 56, 58. This causes armature 52 to be moved bodily predominantly along the direction of an imaginary line that intersects axis 38 and that when viewed along axis 38 is essentially coincident with the radius of the sphere whose end is contacted by the midpoint of the armature. The cooperative effect of the motion of armature 52, of the resilience of spring blade 42, and of the angle of seat 34 is such that the sphere is moved from concentricity with axis 38 to eccentricity with axis 38 with the result that hole 36 opens. Sphere 40 is actually caused to roll slightly up seat 34 in the direction toward post 44. When energization of the solenoid coil terminates, the magnetic attractive force that stator 50 had been exerting on the armature ceases, and this enables the resiliency of spring blade 42 to return the sphere to concentricity with axis 38 and resulting closure of hole 36.

Hole 36 is surrounded by the tip end, or nozzle, 68 of the fuel injector at which fuel is injected into the engine. An O-ring seal 70 is seated in a groove extending around the sidewall of the injector tip end. Electric lead wires 72 from the injectors are disposed in channels 74 in carrier 22 and extend to a connector 76 at the near end of the carrier as viewed in FIG. 5. The solenoid coils, stators, and seat members are secured within the carrier wells by any suitable means of securement, and a cover 78 containing suitable windows each providing an inlet for each fuel injector fits over the carrier to entrap the lead wires in the channels. The cover may comprise certain means of confinement for certain of the components of the fuel injectors, such as projections 79 (FIG. 2) that serve to confine armatures 52 and to limit the extent to which the spring blades 42 can be flexed away from seat members 32.

The combination of the carrier, the injectors, and the cover forms a sub-assembly that is assembled into tube 24 by insertion through one end of the tube. As perhaps best seen in FIG. 6, the sub-assembly has an envelope that is smaller than the main longitudinal hole 81 in tube 24. The sub-assembly is inserted into the tube to align the injector tip ends 68 with corresponding circular holes 82 through the wall of the tube. The sub-assembly is then displaced radially to pass the tip ends into holes 82 so that O-rings 70 seal between the tip ends and the holes in fluid-tight manner. A keeper 84 is then inserted via the same open end of the tube into the space 86 (FIG. 7) that exists between the sub-assembly and the semi-circumference of the tube wall that is generally opposite holes 82. Keeper 84 is illustrated as a length of angled metal that may have a certain resiliency for resiliently fitting between the sub-assembly and the tube wall in the manner portrayed. The bend of keeper 84 bears against the inside of the wall of tube 24 diametrically opposite holes 82 and the keeper's two sides extend from the bend to capture the sub-assembly in the assembled position of FIG. 7.

In use pressurized liquid fuel is introduced into tube 24 via a suitable inlet so that the fuel injectors are essentially completely immersed in fuel. The fuel rail may contain a pressure regulator and also have a return outlet for return fuel when the rail is part of a recirculating fuel system. Neither an inlet fitting, a return outlet fitting, nor a pressure regulator are specifically shown in the drawing Figs., nor are the provisions that would be required for enclosing the tube ends if the inlet and/or outlet were to be located in other than such ends. The particular configuration for any specific fuel rail embodying the principles of the present invention will depend on the specific engine which the fuel rail must fit. In use, connector 76 serves to connect the fuel injectors to the usual engine management computer so that the injectors are operated at the proper times and for the proper durations. The energization of an injector solenoid will open the injector to cause an injection of fuel from the interior of the tube to be emitted at the injector tip end through hole 36. Metering of injected fuel can be performed by a thin orifice disc (not shown) mounted on the injector tip end in covering relation to the outlet of hole 36. The injection terminates with the termination of solenoid energization.

Figure 8:
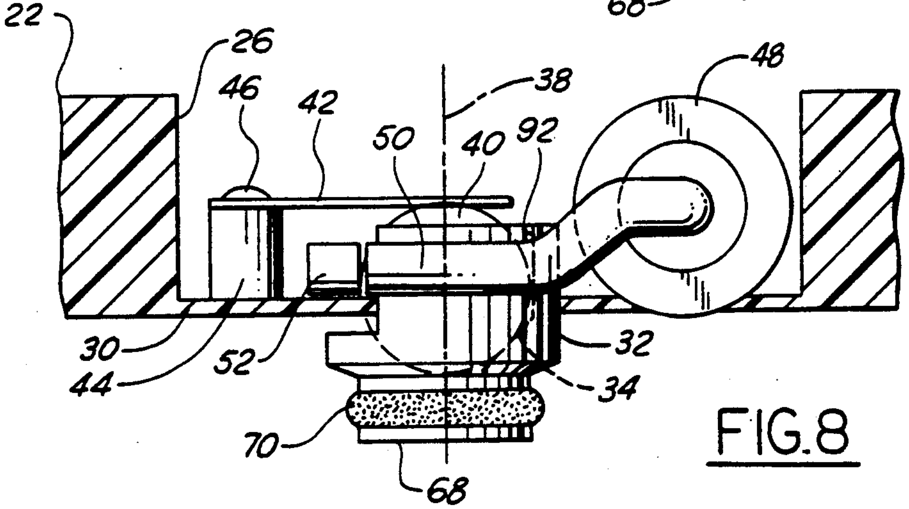
FIG. 8 is an elevational view of another embodiment of fuel injector.

FIG. 8 presents an alternate embodiment of fuel injector using the same earlier reference numerals to designate like parts. The essential difference is that the injector of FIG. 8 places the cantilever mounting of spring blade 42 on the opposite side of seat 34 from solenoid coil 48. This allows the magnetic circuit path to be shortened since the solenoid coil can be placed closer to the seat and the legs of the stator can be shorter.

Figure 9:
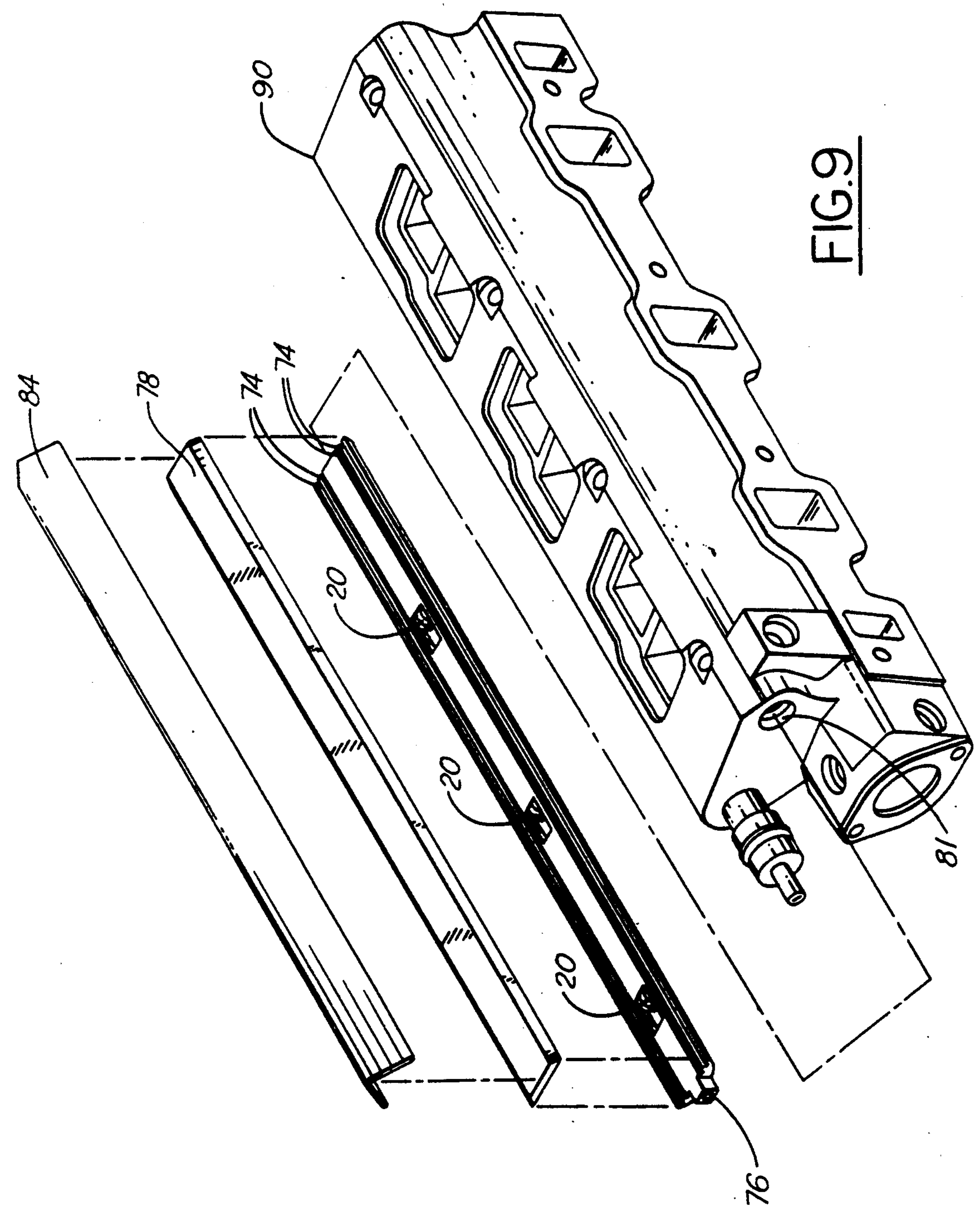
FIG. 9 is an exploded perspective view of an embodiment in which the fuel rail is integrated in an engine manifold.

FIG. 9 presents an alternate embodiment of fuel rail using the same earlier reference numerals to designate like parts. FIG. 9 shows the tube hole 81 to be an integral part of an engine manifold 90 into which the sub-assembly composed of the carrier, the fuel injectors, and the cover is inserted. The keeper 84 is also inserted into hole 81 to capture the sub-assembly in assembled position in the same manner as in FIG. 7.

Figure 3:
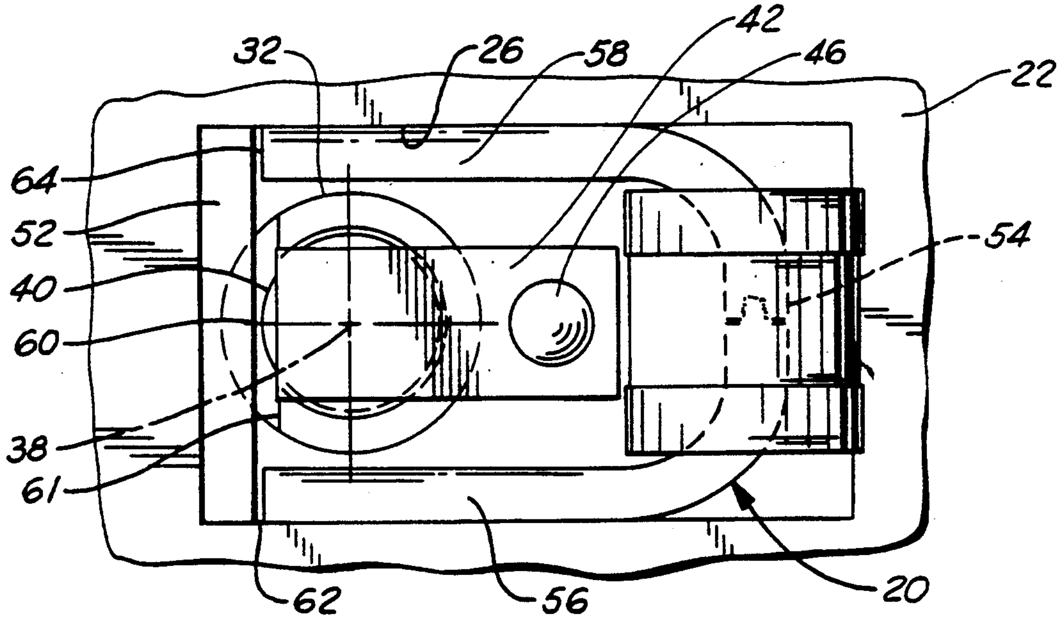
FIG. 3 is a top view of FIG. 2.
Figure 4:
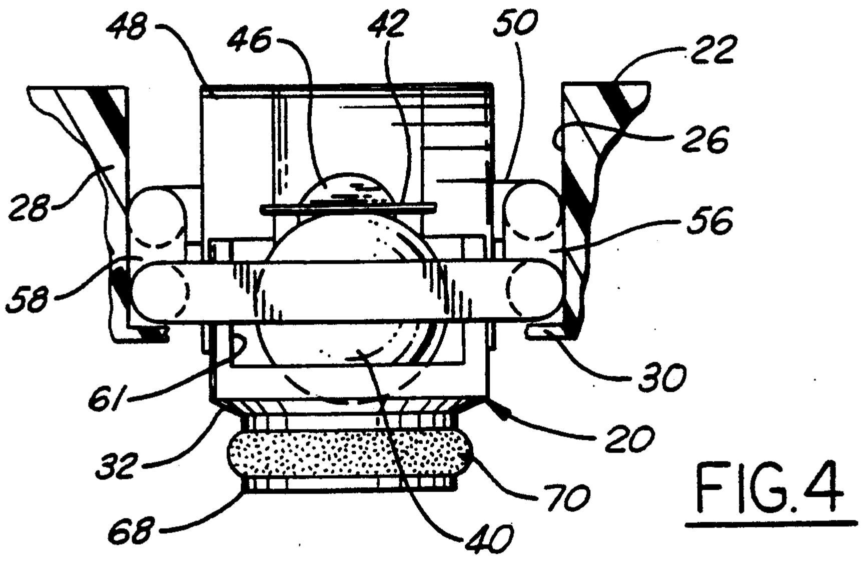
FIG. 4 is a left side view of FIG. 2.
Figure 6:
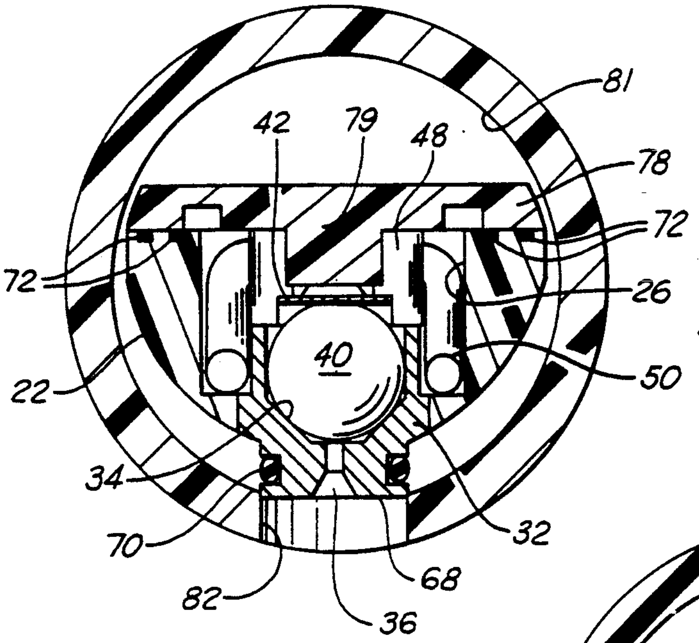
FIG. 6 is a transverse cross sectional view through the fuel rail assembly of FIG. 5 on a different scale and illustrates further detail, including a particular step in the process of fabricating the fuel rail assembly.
Figure 7:
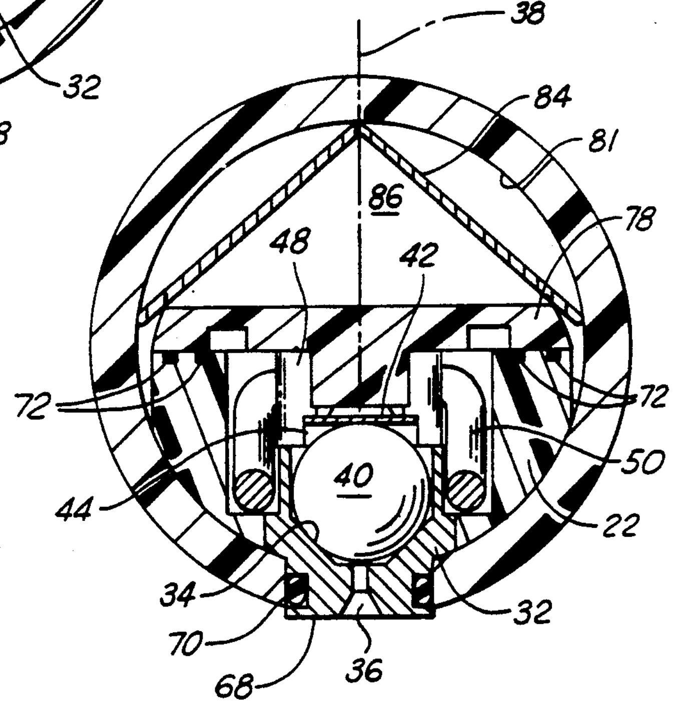
FIG. 7 is a view similar to FIG. 6 illustrating the condition after completion of the step being portrayed by FIG. 6.

The materials, surface finishes, hardnesses, elasticities, etc. of the various parts should be chosen to provide acceptable performance and longevity in their particular operating environment. So that seat member 32 does not shunt flux from the magnetic circuit, it is fabricated from non-magnetically-permeable material, such as a suitable stainless steel. It is contemplated that certain plastics may be useful for certain parts. For example, carrier 22, tube 24, and cover 78 can be made from plastics that are inert when placed in a wet fuel environment, and of course all materials that are exposed to fuel must be inert to the particular fuel composition or compositions that are used. It is contemplated that sphere 40 can itself be a suitable plastic. FIG. 3 illustrates a particular construction for stator 50 that may be used to advantage in fabricating the fuel injector's magnetic circuit. Rather than being a one-piece element, the stator is constructed from two separate pieces, each of which comprises the entirety of one of the stator's legs and a fraction of its base. One piece contains a threaded hole in the end of its base portion and the other piece contains a threaded shank in the end of its base portion. The two pieces are joined by screwing the threaded shank into the threaded hole after the respective base portions have been inserted into the solenoid coil.

The magnetic circuit is preferably constructed such that the working gaps do not close to an extent that allows full surface-to-surface contact of the armature with the ends of the stator legs. This can be accomplished by designing seat member 32, sphere 40, and the magnet circuit such that when the sphere is displaced from concentricity with axis 38, its travel will be arrested by abutment with an axial wall 92 (FIG. 8) of seat member 32 before the working gaps have fully closed. Axial wall 32 extends away from seat 34 parallel to axis 38. It is also possible to place a non-magnetic coating over the ends of the stator and the armature. Because the armature experiences relatively small displacement as it is operated, an equivalent armature could comprise a pivotal mounting at one end so that the armature travel is executed over a small arc. This will still result in essentially the same action on the sphere, i.e. motion that is directed essentially toward axis along the radial of the sphere that is contacted by the middle of the armature.

FIGS. 10–13 illustrate a modified form in which like reference numerals are used to designate corresponding parts that were previously identified and described in earlier embodiments. The embodiment of FIGS. 10–13 includes a swirl ring 94 closely girdling sphere 40. Swirl ring 94 has an upper surface 96 and a lower surface 98 that are arranged mutually parallel and generally perpendicular to axis 38. A lip 100 projects downwardly and inwardly from surface 98. Swirl ring 94 further has a circular outside diameter surface 102 extending perpendicularly between surfaces 96 and 98. It also has an inside diameter surface 104 extending from surface 96, initially as a cylinder parallel with surface 102 and then spherically on a radius which is slightly larger than that of sphere 40.

Figure 10:
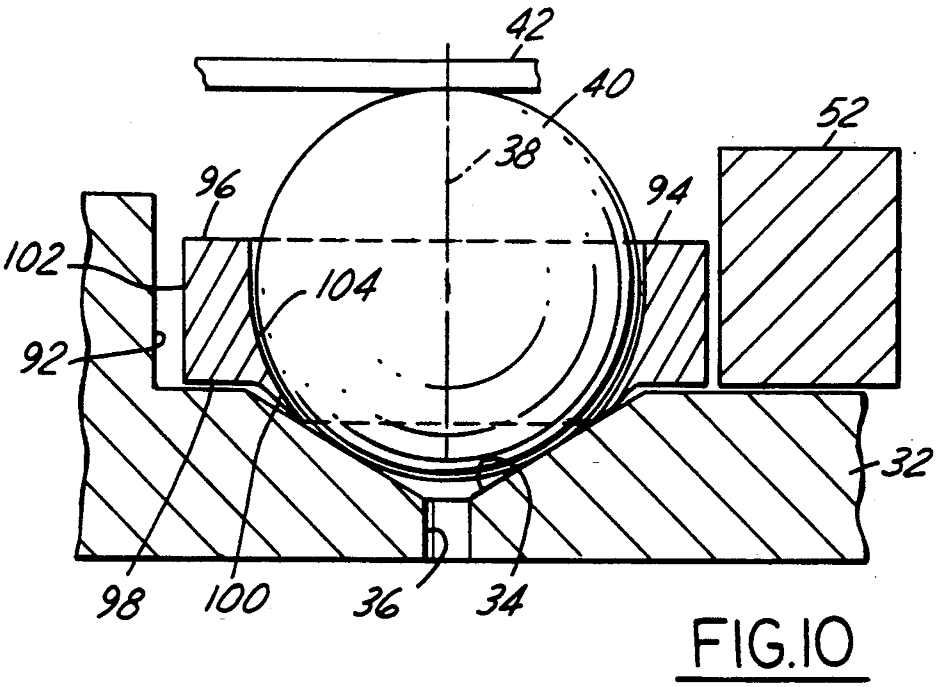
FIG. 10 is a fragmentary cross section through a fuel injector which includes a swirl ring associated with the sphere and seat.
Figure 11:
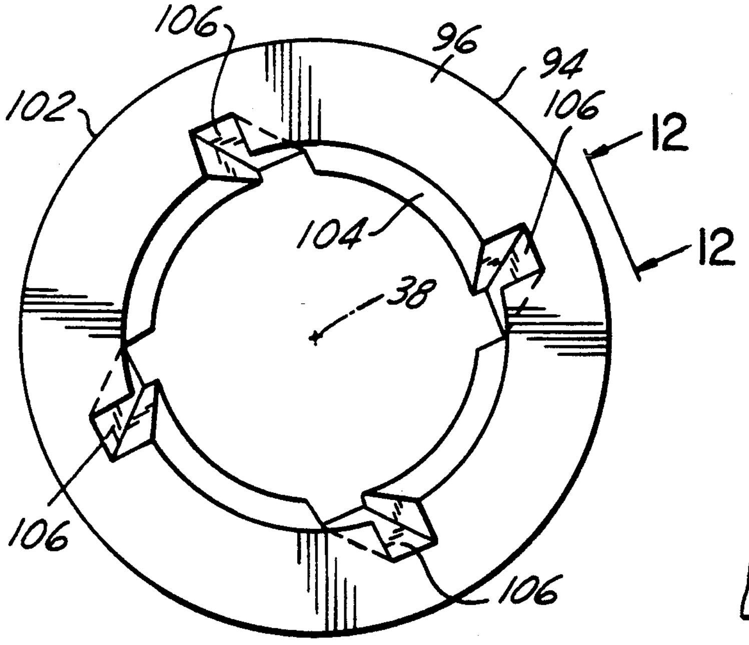
FIG. 11 is a full top plan view of the swirl ring of FIG. 10 by itself on a slightly enlarged scale.
Figure 12:
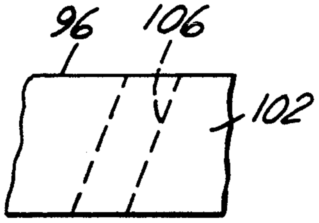
FIG. 12 is a fragmentary view in the direction of arrows 12—12 in FIG. 11.

The diameter of the initially cylindrical portion of surface 104 allows the sphere to be disposed within swirl ring 94 in the manner shown in FIG. 10. In the completed assembly, the swirl ring is essentially captured on the sphere since it is not possible for the swirl ring to move upwardly beyond the interference that would occur between the sphere and lip 100.

The inside diameter surface 104 is interrupted by four slanted (approximately ten degrees slant) through-slots 106 that are arranged in a symmetrical pattern about axis 38. These through-slots are open toward sphere 40 for conveying fuel to orifice 36 when the sphere is bodily displaced to eccentricity with axis 38, and they serve to impart a circumferential component of motion to fuel passing from orifice 36. Desirably, the flow area decreases along the length of each through-slot to induce a local increase in flow velocity. The sides of each through-slot also have a slight draft, as shown. Swirl ring 94 is disposed between armature 52 and sphere 40 such that the armature motion for unseating the sphere creates a force that acts through ring 94 substantially on a radial to the sphere. (In the earlier embodiments, the armature directly contacted the sphere.) There is sufficient clearance between the parts that allows the sphere to roll along the seat although a portion of the sphere will be contact with a portion of surface 104 as the sphere is being unseated. Surface 92 provides a limit stop in the same manner as in the previous embodiments except that now it is the abutment of swirl ring 94 with surface 92 that arrests the motion. When the magnetic circuit is de-energized, spring 42 operates the sphere to reseat on seat 34 in the same manner as described for earlier embodiments. It is contemplated that swirl ring 94 may be either a machined, sintered, or plastic part. The through-slots are arranged so that they are never obstructed by the horizontal shelf surface of member 32 that directly underlies surface 98, and the ring is of sufficient overall diameter to overlap the horizontal shelf surface. In this way, substantially the entire fuel flow will be unobstructed flow through the through-slots.

Figure 13:
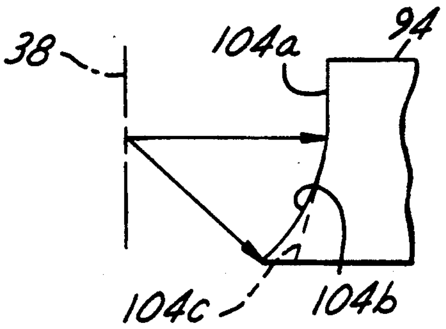
FIG. 13 is a fragmentary cross section illustrating an alternate embodiment of swirl ring.

FIG. 13 shows a modified form of swirl ring 94 which does not include a distinct lip 100. The upper portion **104*a* of the inside diameter surface 104 is cylindrical perpendicular to axis 38. The remainder is on a spherical radius 104*b* slightly larger than that of sphere 40. The need for a lip 100 is apt to be principally a function of the size of the sphere and the swirl ring, although the presence of a lip will serve to reduce the "dead" volume of fuel below the point at which the sphere seats on the seat. At its minimum opening, across the lowest point of inside diameter surface 104**, the swirl ring must be sufficiently small to assure that it will not ride up and over the sphere during use. Likewise the lip must not interfere with sphere seating.

It is possible to replace the spherical radius 104b with a frusto-conical surface 104c, shown in broken lines in FIG. 13. This will produce less swirl since there will be more leakage of non-swirl fuel passing between the ring and sphere.

Figure 14:
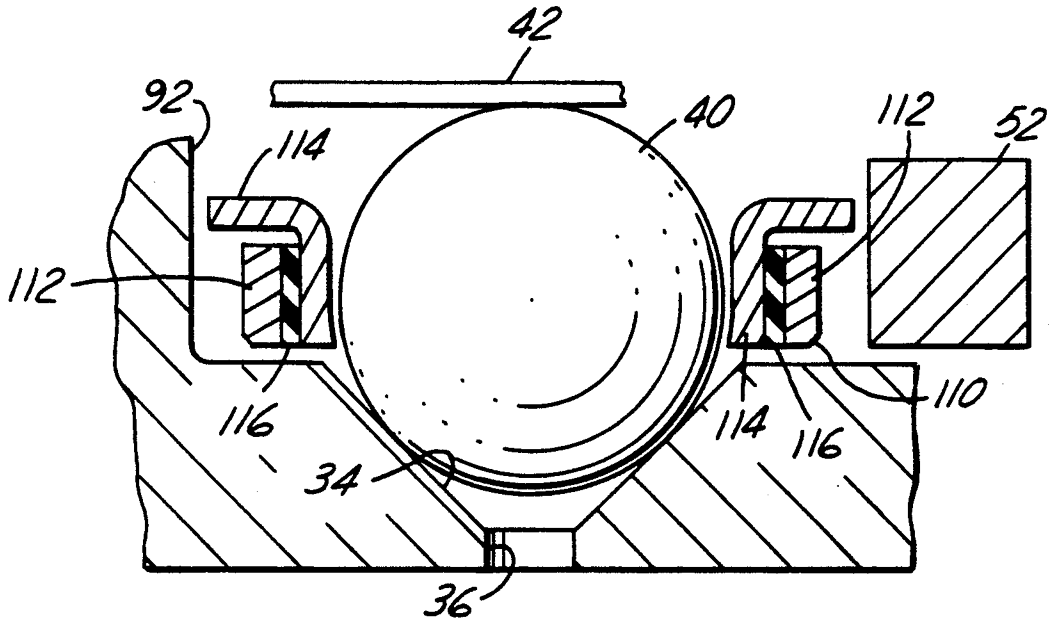
FIG. 14 is a fragmentary cross section through a fuel injector which includes a control ring associated with the sphere and seat.

FIG. 14 illustrates another modified form in which like reference numerals are used to designate corresponding parts that were previously identified and described in earlier embodiments. This embodiment has a harmonic control ring 110 closely girdling sphere 40, but allowing the sphere to swivel therein. It has relatively harder outer and inner rings 112, 114, and a relatively less hard intermediate ring 116. For example ring 116 may be a suitable elastomer, and rings 112, 114 metal, with the elastomer suitably joining with the metals, such as by bonding or crimping. The inside diameter surface of ring 114 has a close clearance fit with respect to sphere 40, for example 0.0003 inches radial clearance. The elastomeric material performs a control function for attenuating certain undesirable impact forces that occur as a result of the seating and unseating of the sphere by the armature and that may otherwise cause undesirable sphere bounce. Clearance is necessary to allow sphere rotation, but should be kept as small as possible since it represents lost motion between the sphere and the harmonic control ring. Residual magnetism is apt to keep the armature in contact with the outer metal ring 112 so that when the sphere is seated, the control ring is slightly eccentric to the sphere.

As in the embodiment of FIGS. 10–13, the embodiment of FIG. 14 utilizes the ring as the medium through which the armature motion is transmitted to unseat the sphere. Travel is arrested by control ring abutment with stop surface 92. The outside diameter of ring 114 is greater than that of ring 112 so that it is ring 114, rather than ring 112, which abuts surface 92. Upon such abutment, energy is dissipated in ring 116. The energy absorption principle is the same as that in my commonly assigned U.S. Pat. No. 4,766,405. Upon de-energization of the solenoid, spring 42 returns the sphere to seated condition. To keep the control ring captured on the sphere while allowing the sphere to be assembled into the control ring, the upper portion of the inside diameter is slightly larger than the sphere diameter while the diameter across the bottom of the inside diameter surface is less than the sphere diameter. Although from FIG. 14 one might perceive that the point at which armature 52 abuts the outside diameter of ring 114 may not lie on the projection of a radial that is essentially coincident with a radial to the point at which the inside diameter of ring 114 abuts sphere 40, the force on the sphere is nonetheless essentially coincident with a radial.

Figure 15:
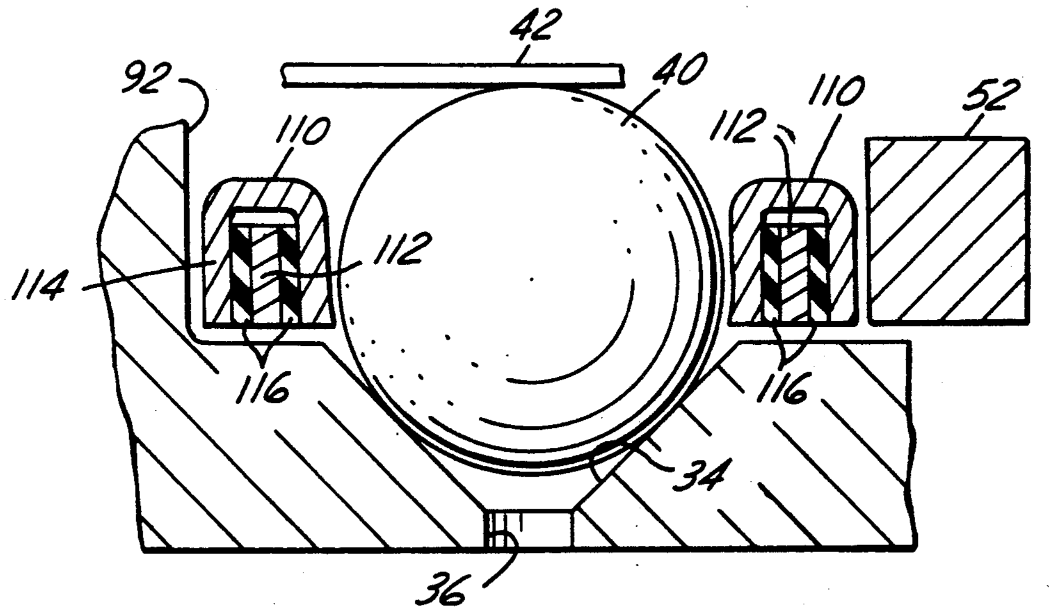
FIG. 15 is a view similar to FIG. 14, illustrating a modified form.

FIG. 15 shows another form of harmonic control ring in which ring 114 has a U-shaped cross section and in which two elastomeric rings 116 are used. One ring 116 is between the I. D. of ring 112 and the inner leg of the U of ring 114 while the other ring 116 is between the O.D. of ring 112 and the outer leg of the U of ring 114. Any given design of harmonic control ring can incorporate one or multiple elastomeric rings to control one or a number of different frequencies, and the elastomeric rings and metal rings may be operatively related by any suitable means, such as bonding or crimping.

The sphere-swirl ring clearance dimensions for the FIG. 10–13 embodiment are similar to those mentioned for the sphere-control ring FIG. 14 embodiment. It is of course to be understood that the drawings may be somewhat exaggerated for illustrative purposes.

While a presently preferred embodiment has been illustrated and described, it should be understood that principles of the invention may be practiced in other equivalent ways. For example, the control and swirl features may be incorporated into a single ring.

What is claimed is:

1. In a fuel injector which is operated by electric operating means and comprises body structure having a fuel inlet, a fuel outlet, and a frusto-conical seat that circumscribes an orifice and is disposed between said fuel inlet and said fuel outlet, a sphere that is disposed for coaction with said seat to selectively open and close said orifice to fuel flow between said fuel inlet and said fuel outlet, resilient means acting to resiliently urge said sphere along an imaginary axis about which said frusto-conical seat is a surface of revolution toward concentrically seating on said seat and thereby closing said orifice, the improvement which comprises sphere-actuating means comprising a movable bar that is disposed along side said sphere and operated by said electric operating means to execute motion that is predominantly along the direction of an imaginary line that intersects said axis, said bar executing such motion toward and from said axis in accordance with an electric control signal applied to said electric operating means, such motion of said bar toward said axis creating a force acting on said sphere at the end of a radial of said sphere which radial, when viewed along said axis, is essentially coincident with said imaginary line, and such force created by such motion of said bar along said imaginary line being effective, in cooperation with said seat and resilient means, to cause said sphere to be bodily displaced from concentricity with said axis to eccentricity with said axis and thereby open said orifice to flow, and such motion of said bar away from said axis being effective to allow said resilient means, in cooperation with said seat, to cause said sphere to be bodily displaced from eccentricity with said axis to concentricity with said axis and thereby close said orifice to flow.

2. The improvement set forth in claim in which said bar is a free element that is captured within a confined space in the fuel injector.

3. The improvement set forth in claim in which said fuel injector comprises a magnetic circuit that operatively couples said electric operating means with said bar, said magnetic circuit including a stator through which magnetic flux is conducted to said bar, said bar comprising magnetically permeable material, and working gap means between said stator and said bar through which said magnetic flux is conducted.

4. The improvement set forth in claim 3 in which said working gap means comprises two working gaps at opposite ends of said bar.

5. The improvement set forth in claim 4 including abutment means disposed to be abutted by said sphere to limit the extent to which said sphere can be eccentrically displaced relative to said axis and to prevent the full closure of said working gaps when said sphere abuts said abutment means.

6. The improvement set forth in claim in which said resilient means comprises a resilient blade that resiliently bears against said sphere and that is cantilever-mounted on said body structure adjacent said sphere.

7. The improvement set forth in claim in which said sphere-actuating means also comprises ring structure that closely girdles said sphere and through which said bar acts to create such force for causing said sphere to be bodily displaced from concentricity with said axis to eccentricity with said axis.

8. The improvement set forth in claim 7 in which said ring structure comprises control means for attenuating impact forces created by the bodily displacement of said sphere between concentricity with said axis and eccentricity with said axis.

9. The improvement set forth in claim 8 in which said ring structure comprises relatively more rigid outer and inner ring structures between which said control means is disposed as relatively less rigid intermediate ring structure.

10. The improvement set forth in claim 1 in which said sphere-actuating means also comprises control means for attenuating impact forces created by the bodily displacement of said sphere between concentricity with said axis and eccentricity with said axis.

11. The improvement set forth in claim 1 including a swirl ring closely girdling said sphere and containing one or more inclined through-slots that are open toward said sphere for conveying fuel when said sphere is eccentric to said axis so as to impart a circumferential component of motion to fuel passing from said fuel outlet.

12. In a fuel injector which is operated by electromagnetic operating means and comprises body structure providing a fuel inlet, a fuel outlet, and a frustoconical seat that circumscribes an orifice and is disposed between said fuel inlet and said fuel outlet, a sphere that is disposed between said fuel inlet and said fuel outlet for coaction with said seat to selectively open and close said orifice to fuel flow between said fuel inlet and said fuel outlet, resilient means acting to resiliently urge said sphere along an imaginary axis about which said frustoconical seat is a surface of revolution toward concentrically seating on said seat and thereby closing said orifice, said electromagnetic operating means and said resilient means being effective to operate said sphere to selectively open and close said orifice to fuel flow, the improvement which comprises said resilient means comprising a resilient blade that resiliently bears against said sphere and that is cantilever-mounted on said body structure adjacent said sphere.

13. The improvement set forth in claim 12 in which said body structure comprises a post adjacent said seat, and said blade is cantilever-mounted on said post.

14. The improvement set forth in claim 13 in which said electromagnetic operating means comprises a solenoid coil, and said solenoid coil and said post are disposed on the same side of said seat.

15. The improvement set forth in claim 13 in which said electromagnetic operating means comprises a solenoid coil, and said solenoid coil and said post are disposed on opposite sides of said seat.

16. The improvement set forth in claim 13 in which said electromagnetic operating means is operatively coupled with said sphere by a magnetic circuit arranged to encircle said sphere, and said magnetic circuit comprises a stator that conducts magnetic flux to an armature that acts on said sphere.

17. The improvement set forth in claim 16 in which said armature comprises a movable bar that is disposed along side said sphere and operated by said electromagnetic operating means acting through said magnetic circuit to execute motion that is predominantly along the direction of an imaginary line that intersects said axis, said bar executing such motion toward and from said axis in accordance with an electric control signal applied to said electromagnetic operating means, such motion of said bar toward said axis causing said bar to act directly against said sphere at the end of a radial of said sphere which radial, when viewed along said axis, is essentially coincident with said imaginary line, and such motion of said bar along said imaginary line being effective, in cooperation with said seat and blade, to cause said sphere to be bodily displaced from concentricity with said axis to eccentricity with said axis and thereby open said orifice to flow, and such motion of said bar away from said axis being effective to allow said blade, in cooperation with said seat, to cause said sphere to be bodily displaced from eccentricity with said axis to concentricity with said axis and thereby close said orifice to flow.

18. The improvement set forth in claim 16 in which a ring structure closely girdles said sphere, and said armature comprises a movable bar that is disposed along side said sphere and ring structure and operated by said electromagnetic operating means acting through said magnetic circuit to execute motion that is predominantly along the direction of an imaginary line that intersects said axis, said bar executing such motion toward and from said axis in accordance with an electric control signal applied to said electromagnetic operating means, such motion of said bar toward said axis acting, via said ring structure, on said sphere at the end of a radial of said sphere which radial, when viewed along said axis, is essentially coincident with said imaginary line, and such motion of said bar along said imaginary line toward said axis being effective, in cooperation with said seat and blade, to cause said sphere to be bodily displaced from concentricity with said axis to eccentricity with said axis and thereby open said orifice to flow, and such motion of said bar away from said axis being effective to allow said blade, in cooperation with said seat, to cause said sphere to be bodily displaced from eccentricity with said axis to concentricity with said axis and thereby close said orifice to flow.

19. The improvement set forth in claim 18 in which said ring structure comprises control means for attenuating impact forces created by the bodily displacement of said sphere between concentricity with said axis and eccentricity with said axis.

20. The improvement set forth in claim 19 in which said ring structure comprises relatively more rigid outer and inner ring structures between which said control means is disposed as relatively less rigid intermediate ring structure.

21. The improvement set forth in claim 12 further including control means girdling said sphere for attenuating impact forces created by the operation of said sphere to open and close said orifice to flow.

22. The improvement set forth in claim 12 including a swirl ring closely girdling said sphere and containing at its inside diameter one or more inclined through-slots that are open toward said sphere for conveying fuel when said sphere is operated to open said orifice to flow so as to impart a circumferential component of motion to fuel passing from said fuel outlet.

23. In a fuel injector which is operated by an electric solenoid coil and comprises body structure providing a fuel inlet, a fuel outlet, and a frusto-conical seat that circumscribes an orifice and is disposed between said fuel inlet and said fuel outlet, a sphere that is disposed for coaction with said seat and is operated by a magnetic circuit associated with said electric solenoid coil to selectively open and close said orifice to fuel flow between said fuel inlet and said fuel outlet, resilient means acting to resiliently urge said sphere along an imaginary axis about which said frusto-conical seat is a surface of revolution toward concentrically seating on said seat and thereby closing said orifice, the improvement which comprises said magnetic circuit being arranged to encircle said sphere, and said magnetic circuit comprising a stator that conducts magnetic flux to an armature that acts on said sphere.

24. The improvement set forth in claim 23 in which said armature acts on said sphere by directly contacting said sphere.

25. The improvement set forth in claim 24 in which said armature comprises a movable bar that is disposed along side said sphere and operated by said electric solenoid coil acting through said magnetic circuit to execute motion that is predominantly along the direction of an imaginary line that intersects said axis, said bar executing such motion toward and from said axis in accordance with an electric control signal applied to said electric solenoid coil, such motion of said bar toward said axis acting on said sphere at the end of a radial of said sphere which radial, when viewed along said axis, is essentially coincident with said imaginary line, and such motion of said bar along said imaginary line being effective, in cooperation with said seat and resilient means, to cause said sphere to be bodily displaced from concentricity with said axis to eccentricity with said axis and thereby open said orifice to flow, and such motion of said bar away from said axis being effective to allow said resilient means, in cooperation with said seat, to cause said sphere to be bodily displaced from eccentricity with said axis to concentricity with said axis and thereby close said orifice to flow.

26. The improvement set forth in claim 25 in which said magnetic circuit is essentially four-sided, said bar forming one side, and said stator comprising a base and two legs that form the remaining three sides, said base of said stator passing through said electric solenoid coil.

27. The improvement set forth in claim 26 in which said stator comprises two parts assembled together, one part of said stator comprising the entirety of one of said legs and one portion of said base and the other part of said stator comprising the entirety of the other of said legs and another portion of said base.

28. The improvement set forth in claim 27 in which said resilient means comprises a resilient spring blade that is cantilever-mounted on said body structure adjacent said seat.

29. The improvement set forth in claim 23 in which said armature acts on said sphere via a ring structure that closely girdles said sphere.

30. The improvement set forth in claim 29 in which said ring structure comprises control means for attenuating impact forces created by the bodily displacement of said sphere to open and close said orifice to fuel flow.

31. The improvement set forth in claim 30 in which said ring structure comprises relatively more rigid outer and inner ring structures between which said control means is disposed as relatively less rigid intermediate ring structure.

32. The improvement set forth in claim 23 including a swirl ring closely girdling said sphere and containing at its inside diameter one or more inclined through-slots that are open toward said sphere for conveying fuel when said sphere is operated to open said orifice to flow so as to impart a circumferential component of motion to fuel passing from said fuel outlet.

33. In a valve which is operated by electric operating means and comprises body structure having a fluid inlet, a fluid outlet, and a frusto-conical seat that circumscribes an orifice and is disposed between said inlet and said outlet, a sphere that is disposed for coaction with said seat to selectively open and close said orifice to fluid flow between said inlet and said outlet, resilient means acting to resiliently urge said sphere along an imaginary axis about which said frusto-conical seat is a surface of revolution toward concentrically seating on said seat and thereby closing said orifice, the improvement which comprises sphere-actuating means comprising a movable bar that is disposed along side said sphere and operated by said electric operating means to execute motion that is predominantly along the direction of an imaginary line that intersects said axis, said bar executing such motion toward and from said axis in accordance with an electric control signal applied to said electric operating means, such motion of said bar toward said axis creating a force acting on said sphere at the end of a radial of said sphere which radial, when viewed along said axis, is essentially coincident with said imaginary line, and such force created by such motion of said bar along said imaginary line being effective, in cooperation with said seat and resilient means, to cause said sphere to be bodily displaced from concentricity with said axis to eccentricity with said axis and thereby open said orifice to flow, and such motion of said bar away from said axis being effective to allow said resilient means, in cooperation with said seat, to cause said sphere to be bodily displaced from eccentricity with said axis to concentricity with said axis and thereby close said orifice to flow.

34. In a valve which is operated by electromagnetic operating means and comprises body structure providing a fluid inlet, a fluid outlet, and a frusto-conical seat that circumscribes an orifice and is disposed between said inlet and said outlet, a sphere that is disposed between said inlet and said outlet for coaction with said seat to selectively open and close said orifice to flow between said inlet and said outlet, resilient means acting to resiliently urge said sphere along an imaginary axis about which said frusto-conical seat is a surface of revolution toward concentrically seating on said seat and thereby closing said orifice, said electromagnetic operating means and said resilient means being effective to operate said sphere to selectively open and close said orifice to flow, the improvement which comprises said resilient means comprising a resilient blade that resiliently bears against said sphere and that is cantilever-mounted on said body structure adjacent said sphere.

35. In a valve which is operated by an electric solenoid coil and comprises body structure providing a fluid inlet, a fluid outlet, and a frusto-conical seat that circumscribes an orifice and is disposed between said inlet and said outlet, a sphere that is disposed for coaction with said seat and is operated by a magnetic circuit associated with said electric solenoid coil to selectively open and close said orifice to flow between said inlet and said outlet, resilient means acting to resiliently urge said sphere along an imaginary axis about which said frusto-conical seat is a surface of revolution toward concentrically seating on said seat and thereby closing said orifice, the improvement which comprises said magnetic circuit being arranged to encircle said sphere, and said magnetic circuit comprising a stator that conducts magnetic flux to an armature that acts on said sphere.

36. The improvement set forth in claim 35 in which a ring structure closely girdles said sphere and said armature acts on said sphere via said ring structure.

37. In a valve which is operated by electric operating means and comprises body structure having a fluid inlet, a fluid outlet, and a frusto-conical seat that circumscribes an orifice and is disposed between said inlet and said outlet, a sphere that is disposed for coaction with said seat to selectively open and close said orifice to fluid flow between said inlet and said outlet, resilient means acting to resiliently urge said sphere along an imaginary axis about which said frusto-conical seat is a surface of revolution toward concentrically seating on said seat and thereby closing said orifice, the improvement which comprises a ring structure closely girdling said sphere, but allowing said sphere to swivel therein, sphere-actuating means comprising an armature that is disposed along side said sphere and operated by said electric operating means to execute motion that is predominantly along the direction of an imaginary line that intersects said axis, said armature executing such motion toward and from said axis in accordance with an electric control signal applied to said electric operating means and acting through said ring structure to cause said sphere to be bodily displaced from concentricity with said axis to eccentricity with said axis and thereby open said orifice to flow, and such motion of said armature away from said axis being effective to allow said resilient means, in cooperation with said seat, to cause said sphere to be bodily displaced from eccentricity with said axis to concentricity with said axis and thereby close said orifice to flow.

* * * * *